(No Model.)

A. L. BUSH & W. C. CLARK.
FILTER.

No. 421,238. Patented Feb. 11, 1890.

Witnesses:
Wm. F. Bellows.
J. D. Garfield.

Andrew L. Bush
William C. Clark,
Inventors
per Chapin
Attorneys

UNITED STATES PATENT OFFICE.

ANDREW L. BUSH AND WILLIAM C. CLARK, OF WESTFIELD, MASSACHUSETTS.

FILTER.

SPECIFICATION forming part of Letters Patent No. 421,238, dated February 11, 1890.

Application filed June 6, 1889. Serial No. 313,260. (No model.)

*To all whom it may concern:*

Be it known that we, ANDREW L. BUSH and WILLIAM C. CLARK, citizens of the United States, residing at Westfield, in the county of Hampden and State of Massachusetts, have invented new and useful Improvements in Filters, of which the following is a specification.

This invention in filtering mediums consists in filtering-bodies of any suitable form and size made from particles of emery, corundum, or similar material by the admixture therewith of vitrifiable substances; and the invention further consists in the combination, with a suitable filtering-case adapted to receive and permit the discharge therefrom of liquid, of one or more filtering-bodies made from particles of emery, corundum, or similar material by the admixture therewith of vitrifiable substances.

Figure 1:
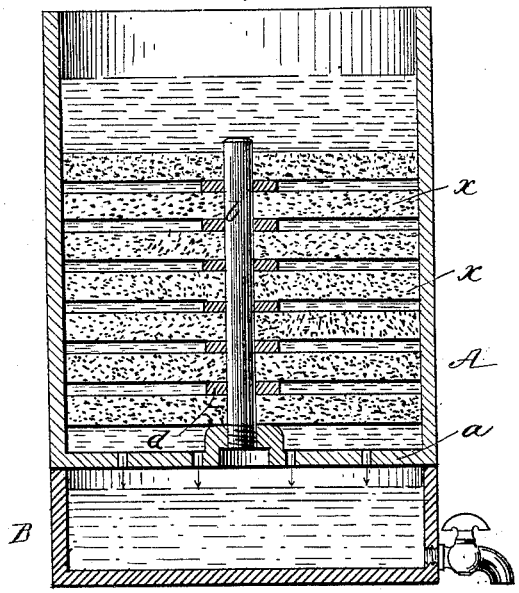
Figure 2:
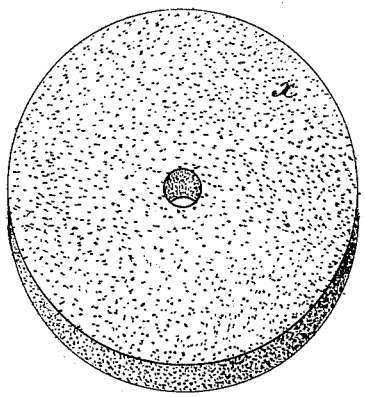
Figure 3:
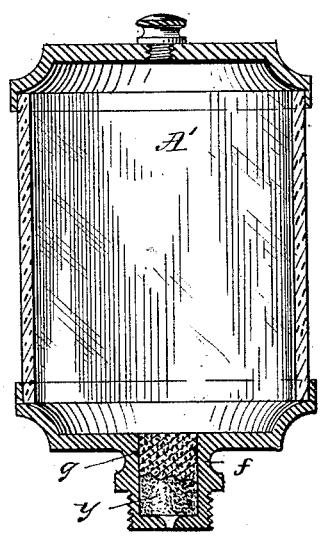

By the aid of the accompanying drawings, the present invention in filtering mediums and apparatus will be more particularly and fully described, Figure 1 being a central vertical sectional view of a filtering tank or case embracing therein a series of filtering-disks of vitrified emery or corundum. Fig. 2 is a perspective view of one of said filtering-disks as employed in the above-named filtering apparatus. Fig. 3 is a central vertical sectional view of a filtering-lubricator, the filtering medium comprised therein being a block of porous vitrified emery or corundum, and Fig. 4 is a perspective view of the last-named block, a part thereof being shown as broken out and in section.

In the manufacture of the filtering medium bodies the emery or corundum and the vitrifying substances—such as alumina, silicate of soda, or similar well-known substances—are mixed together into a moist condition and while in a pasty state molded into blocks or disks of suitable size, the same being then dried and finally exposed to such a degree of heat in a kiln or oven as will produce the vitrifaction of said substances which constitute the binding elements as above mentioned, that cause the adhesion of the particles of emery or corundum. Said vitrifiable material, after vitrifaction has taken place under the process above named, while uniting the particles of emery or corundum does not entirely fill the interstices between said particles, and thereby the molded and baked block will be of a porous nature uniformly throughout.

Figure 4:
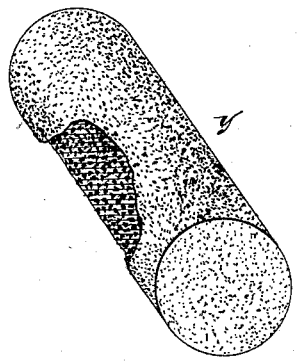

In Figs. 2 and 4 desirable forms of the filtering-blocks are shown, although it will be apparent that innumerable other forms may also be advantageously employed, and the application of the form of the block shown in Fig. 2 is illustrated in Fig. 1, in which A is a cylindrical tank or filter case, having a perforated bottom $a$, below which is a secondary tank B, and said upper tank is provided with an axial post $b$, on which is placed one above another a series of said filtering-blocks or disks $x$, which have axial perforations therein for the passage thereof over said post, said disks peripherally fitting the inner wall of said tank, and preferably separated the one from another by washers $d$.

The above-described filtering apparatus, while eminently advantageous for the filtration of water, is especially applicable for the filtration of oil, more particularly that which has been once used and contains particles of metal, chips, and dirt, and in the percolation of the oil through said filtering medium all the said particles, chips, &c., will be arrested by the said porous vitrified filtering-body.

In Fig. 3 the application of one of the filtering-blocks to a lubricator is shown, in which the axial stem $f$, projecting downwardly from the lower end of the chambered lubricator-body A', is chambered, as at $g$, into which is fitted said block, which in this case is of cylindrical form, as shown at $y$.

What we claim as our invention is—

1. A filtering medium consisting of particles of emery or corundum and a vitrifiable substance, whereby said particles are held together with interstices therebetween, substantially as described.

2. A filtering apparatus consisting of a case or tank having an inlet and an outlet, and a filtering-body in said tank between its inlet and outlet, consisting of particles of emery or corundum and a vitrifiable substance, whereby said particles are held together with interstices therebetween, substantially as described.

ANDREW L. BUSH.
WILLIAM C. CLARK.

Witnesses:
WM. S. BELLOWS,
G. M. CHAMBERLAIN.